United States Patent [19]

Ballard et al.

[11] Patent Number: 4,866,600
[45] Date of Patent: * Sep. 12, 1989

[54] COMPUTER VIDEO CONTROL SYSTEM

[75] Inventors: Jerry L. Ballard, Haltom City; Dale Chatham, Weatherford; Gerald E. Gaulke, Lewisville, all of Tex.

[73] Assignee: Tandy Corporation, Fort Worth, Tex.

[*] Notice: The portion of the term of this patent subsequent to Sep. 15, 2004 has been disclaimed.

[21] Appl. No.: 48,906

[22] Filed: May 11, 1987

Related U.S. Application Data

[63] Continuation of Ser. No. 779,819, Sep. 25, 1985, Pat. No. 4,694,392, which is a continuation of Ser. No. 489,262, Apr. 27, 1983, abandoned.

[51] Int. Cl.[4] .............................................. G06F 3/14
[52] U.S. Cl. .................................... 364/200; 364/231; 364/237.2; 364/237.3; 364/238.3
[58] Field of Search ..................... 364/200, 900, 521; 340/799

[56] References Cited

U.S. PATENT DOCUMENTS

| | | | |
|---|---|---|---|
| 3,648,250 | 3/1972 | Low et al. | 364/200 |
| 4,150,429 | 4/1979 | Ying | 364/200 |
| 4,156,904 | 5/1979 | Minowa et al. | 364/200 |
| 4,203,107 | 5/1980 | Lovercheck | 364/900 X |
| 4,500,956 | 2/1985 | Leininger | 364/200 |
| 4,694,392 | 9/1987 | Ballard et al. | 364/200 |

Primary Examiner—Raulfe B. Zache
Attorney, Agent, or Firm—Wolf, Greenfield & Sacks

[57] ABSTRACT

Video control circuitry for controlling the video format presented to the cathode ray tube or screen and capable of providing a combination of character generation and cell generation along with other video types of control. The video controller may comprise a video memory means for controlling writing into and reading therefrom and means defining both a memory address and a memory data. There is a video data bus coupled to the video memory means and a processor address bus. A cathode ray tube controller has address lines and the address lines are connected to multiplexer means for selecting either the controller address lines or the processor lines. Control means are provided for controlling the multiplexer means so that in one state thereof the video memory means is addressed from the cathode ray tube controller means and in the other state the video memory means is addressed from the central processing unit address. This occurs on an interleaved basis with the CRT clock basically operating at the normal refresh cycle rate. However, in accordance with the invention the CRT clock is essentially divided so that one half of the clock cycle is used for communication from the CPU to the video memory means. This provides for improved screen display.

29 Claims, 17 Drawing Sheets

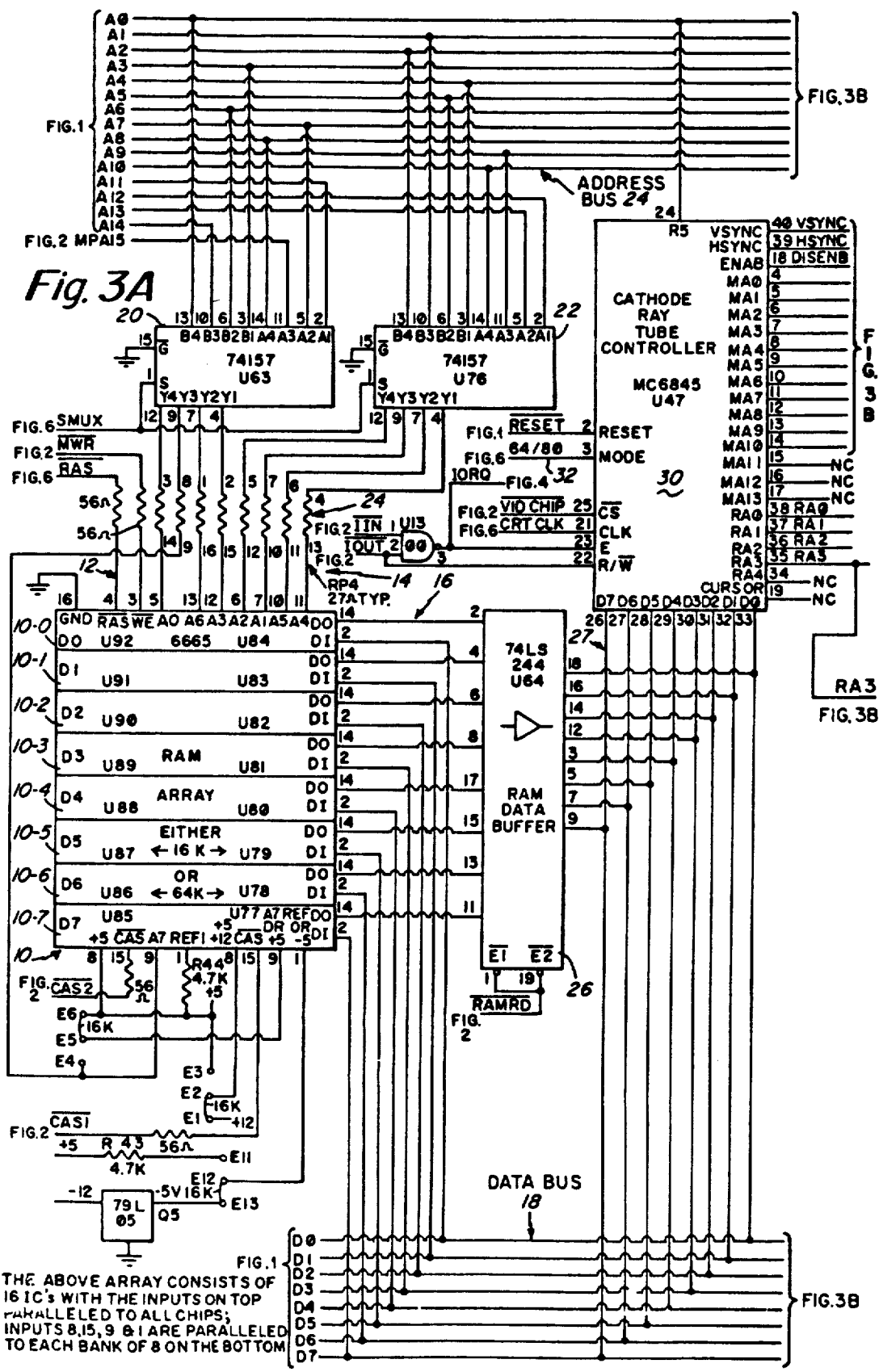

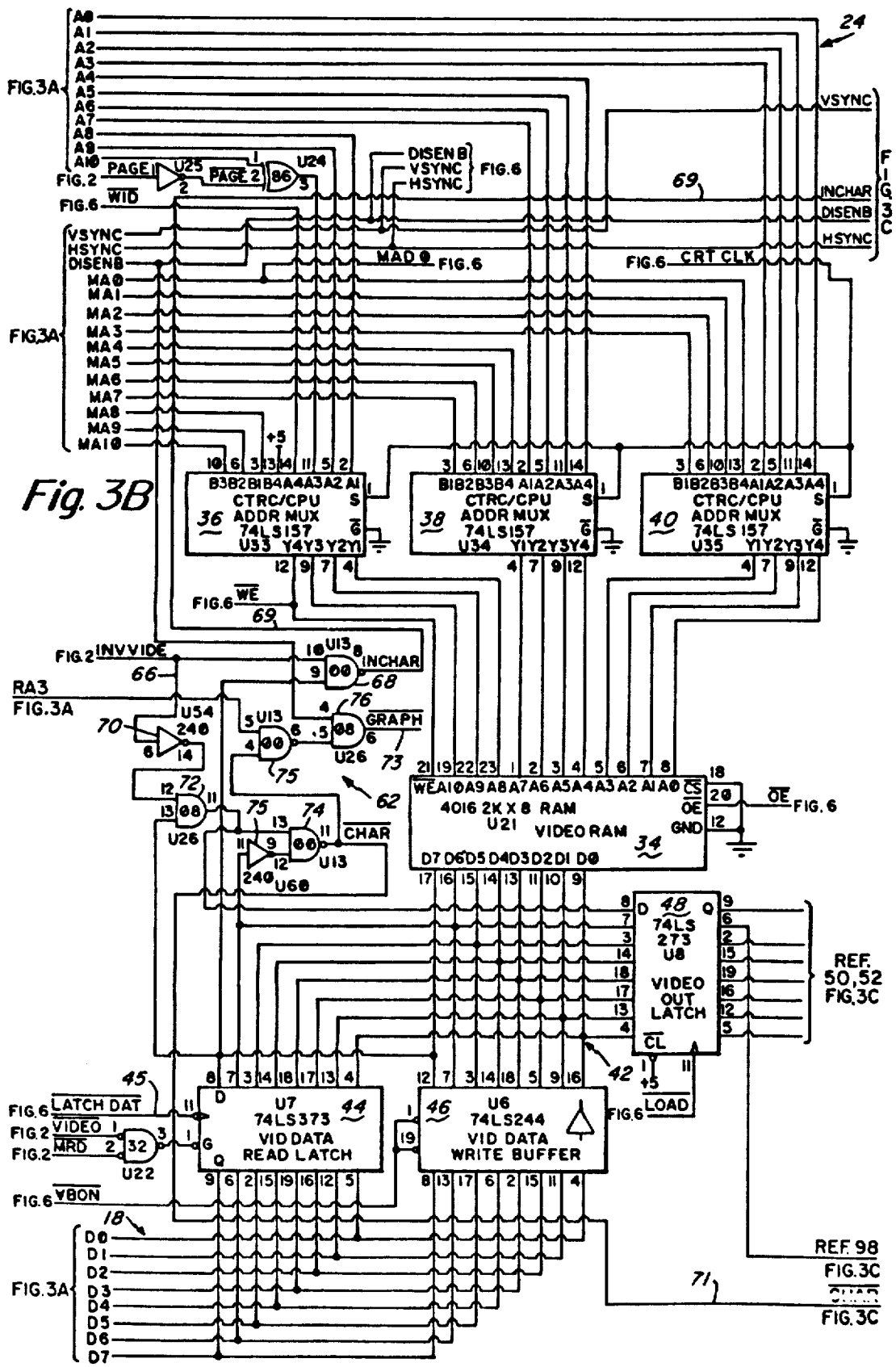

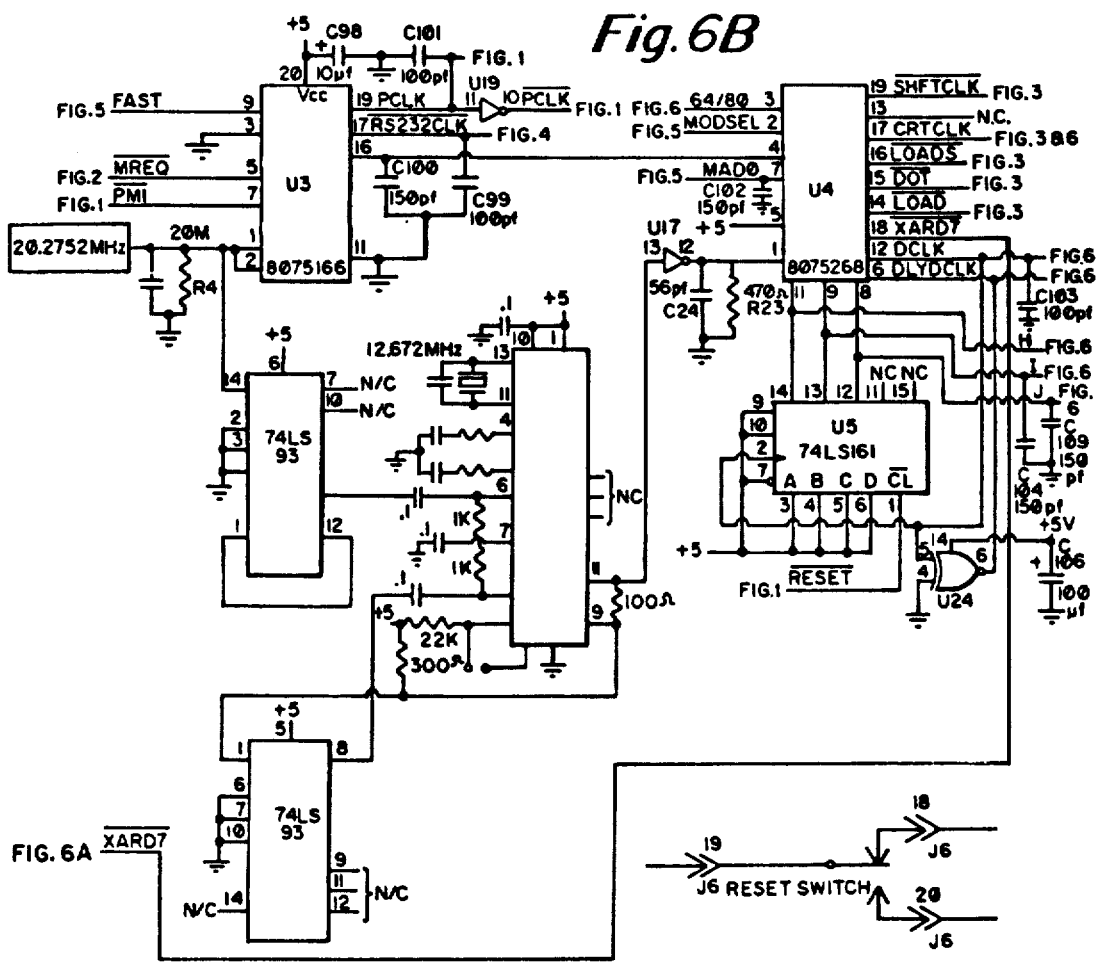
Fig. 6B
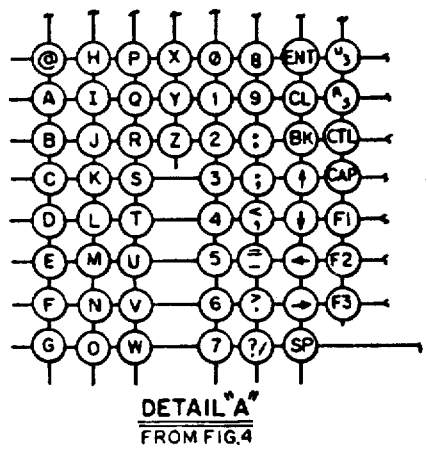
DETAIL "A"
FROM FIG.4
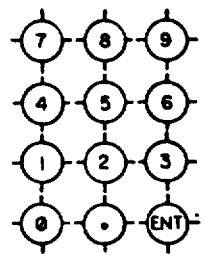
THE ABOVE KEYS (THE NUMERIC KEYPAD) ARE CONNECTED IN PARALLEL WITH SIMILAR KEYS OF THE KEYBOARD MATRIX.

COMPUTER VIDEO CONTROL SYSTEM

This application is a continuation of application Ser. No. 779,819 filed Sep. 25, 1985, which in turn is a continuation of Ser. No. 489, 262 filed Apr. 27, 1983, now abandoned.

BACKGROUND OF THE INVENTION

The present invention relates in general to a micro computer system and pertains more particularly to video controller means which form a part of the micro computer system. The video controller in accordance with the present invention provides for video display and is capable of both character generation control and cell generation control along with many other forms of control to be described hereinafter.

It has been common in the past to provide for CPU communication to the video RAM and this occurs usually during a blanking portion of the cycle. This required a waiting period for access and also by use of the blanking period there was apt to be glitches particularly on the left side of the display. This problem has been eliminated and the operation simplified in accordance with the present invention by providing an interlacing concept on the control of a CRT clock signal.

Accordingly, it is an object of the present invention to provide an improved video controller circuit, preferably for use on the micro computer system, and which provides for enhancement of the screen display.

Another object of the present invention is to provide an improved video controller in accordance with the preceding objects and in which communication between the central processing unit and the video RAM is accomplished on an interleaved basis which permits during one portion of the cycle screen refresh and during a second portion of the cycle permits a read/write sequence between the central processing unit and the video RAM.

SUMMARY OF THE INVENTION

To accomplish the foregoing and other objects of this invention there is provided a video controller, preferably for use in a micro computer system. This system includes a video . memory means for storing video character codes and including means for controlling writing into and reading from the video memory means. This video memory means also has means defining a memory address and memory data. A video data bus coupled to the video memory means. The central processing unit of the micro computer system has both a data bus and an address bus. In the video portion of the system there is a cathode ray tube controller means which has address lines coupled therefrom. In accordance with the invention in order to provide the interleaving concepts, there is provided a multiplexer means having first and second input sets and an output set. In the disclosed embodiment there are actually three separate multiplexers for handling different sets of address lines. Means are provided for coupling the central processing unit address bus to the first input set. Means are also provided for coupling the cathode ray tube controller means address lines to the second input set. Finally, means are provided for coupling the output set from the multiplexer means to the video memory means address input. Control means are provided for controlling the multiplexer means so that in one state the video memory means is addressed from the cathode ray tube controller means and in the other state the video memory means is addressed from the central processing unit. This occurs on a continuous cyclic basis. With regard to the communication with the central processing unit it is noted that the central processing unit includes a data bus and video data read latch means coupling from the video data bus to the central processing unit data bus. There is also preferably provided a video data write register and means coupling the video data write register from the central processing unit data bus to the video data bus. There is provided video output latch means and means coupling the video output latch means to the video data bus. As part of the video circuit there is preferably also provided a character generator means coupled from the video output latch means.

BRIEF DESCRIPTION OF THE DRAWINGS

Numerous other objects, features and advantages of the invention should now become apparent upon reading of the following detailed description taken in conjunction with the accompanying drawing, in which:

FIGS. 3A, 3B and 3C show video circuitry along with the system random access memory and cathode ray tube controller;

FIGS. 6A and 6B show of the micro computer system including the video RAM and random access memory timing circuitry.

DETAILED DESCRIPTION

The video controller of the present invention is preferably adapted for use in a microcomputer which may be of the self-contained desk-top microcomputer type. The microcomputer system includes a microprocessor such as the conventional Z-80 microprocessor shown in FIG. 1A which in the microcomputer system of the present invention is capable of running at either of two different clock rates. It also included preferably two programmable array logic (PAL) circuits used for frequency division and routing of appropriate timing signals.

The computer system is provided with n:ain CPU timing from a 20-MHz. clock. Of the aforementioned PALS, a first PAL U3 divides the main clock signal by five to provide 4 MHz. CPU operation. The main clock is also divided by ten to provide a 2 MHz. rate. The logic also waits the CPU at 4 MHz. clock rate for the M1 cycle. This first PAL U3 also divides the master clock by four to obtain a 5 MHz. clock to be sent to the RS-232 option connector as a reference for the band rate generator. The second PAL U4 selects an appropriate 10 MHz. or 12 MHz. clock video shift clock, and by means of a divider U5, provides additional timing signals to the video display circuitry to be described in further detail hereinafter.

Low level signals from and to the CPU need to be buffered or current amplified in order to drive many other circuits. The 16 address lines are buffered by devices U55 and U66 shown in FIG. 1A which are uni-directional buffers that are permanent - enabled. The eight data lines are buffered by device U71. Since data must flow both to and from the CPU, the device U71 is a bi-directional buffer which can go to a three state condition when not in use. Both direction and enable controls come from the address decoding section.

Figure 1A:
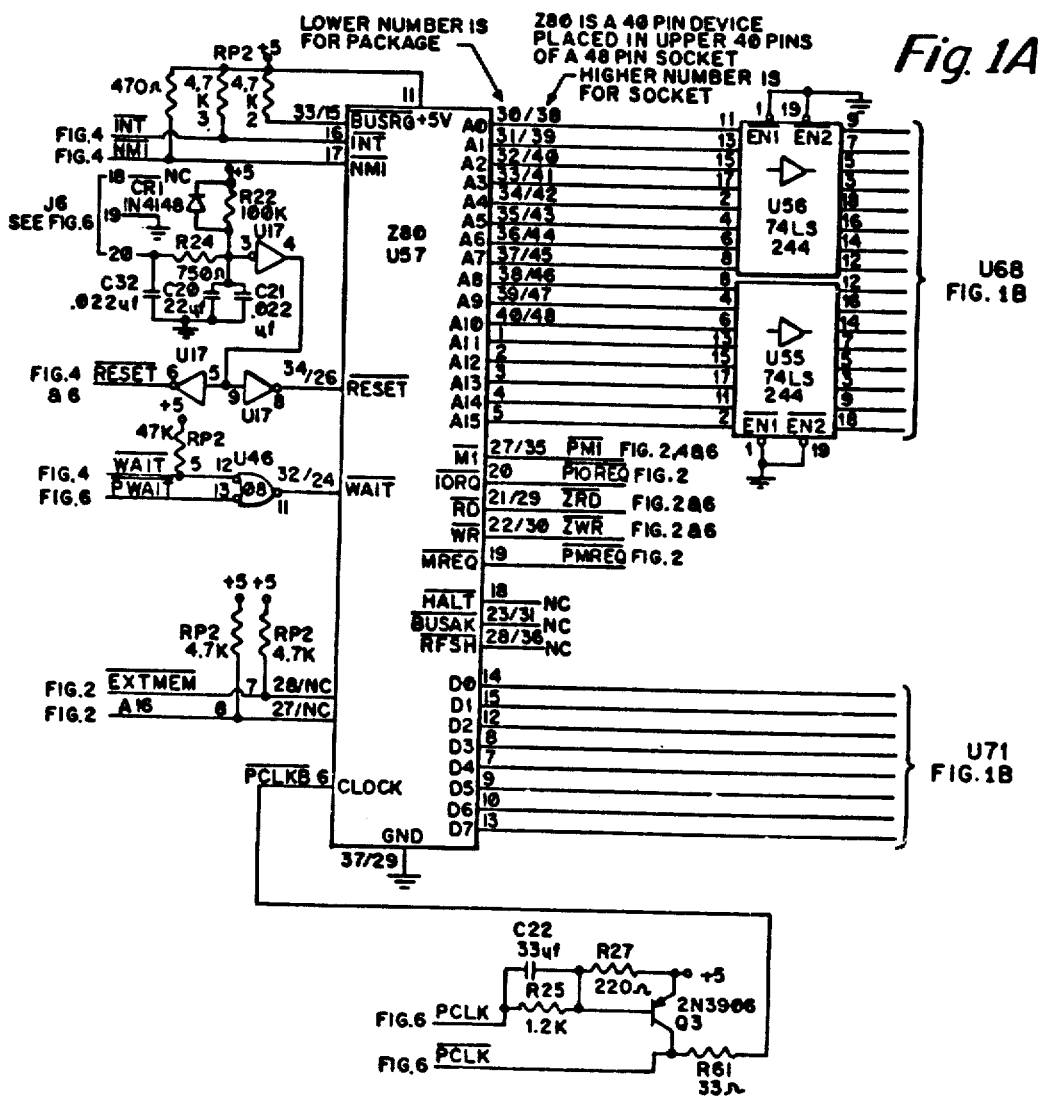
FIGS. 1A and 1B show one portion of the micro computer system including the basic Z80 processor.
Figure 2A:
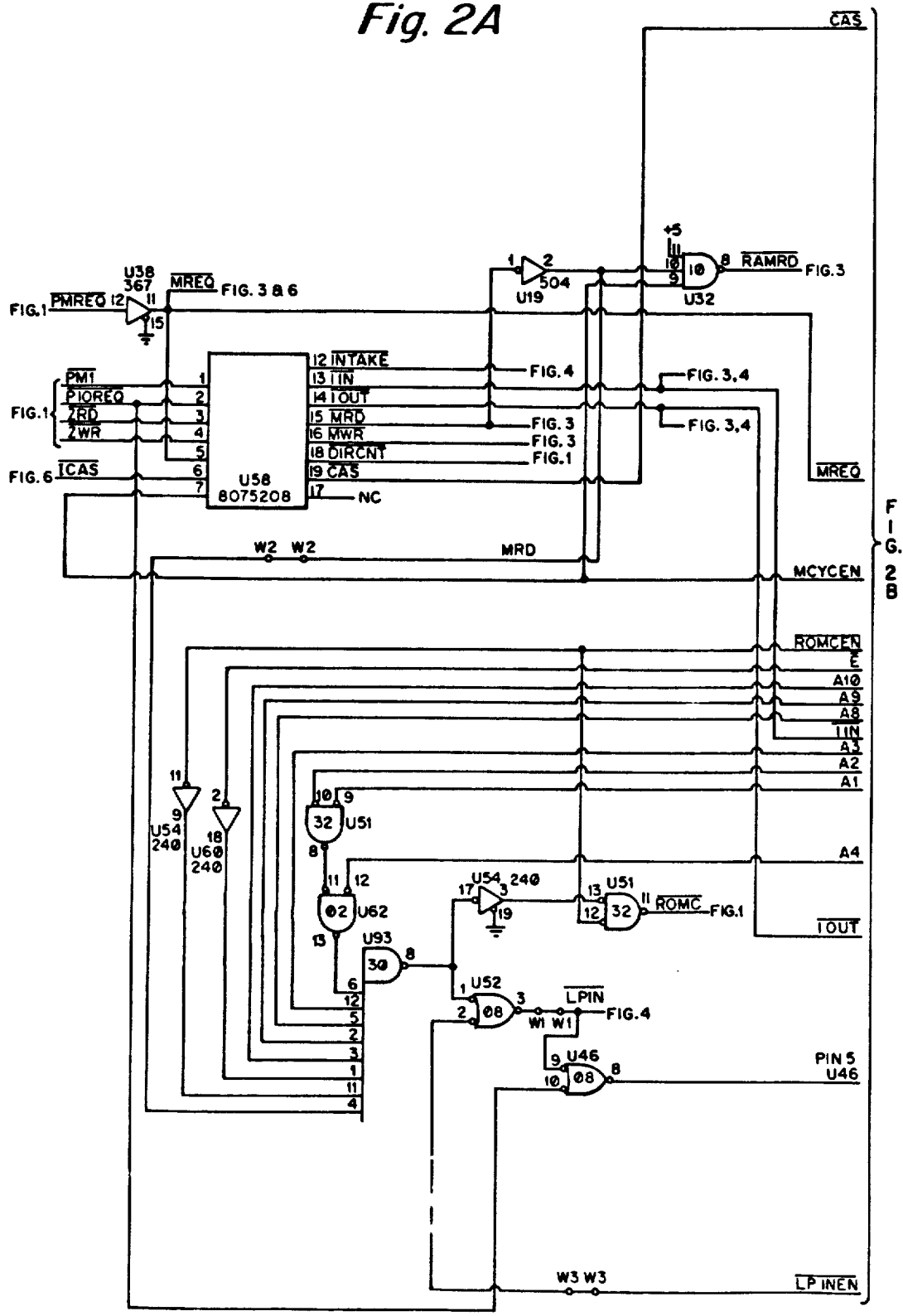
FIGS. 2A, 2b and 2C show of the micro computer system including programmable array logic (PAL) circuits and decoders used in generating timing signals used in the system.
Figure 2B:
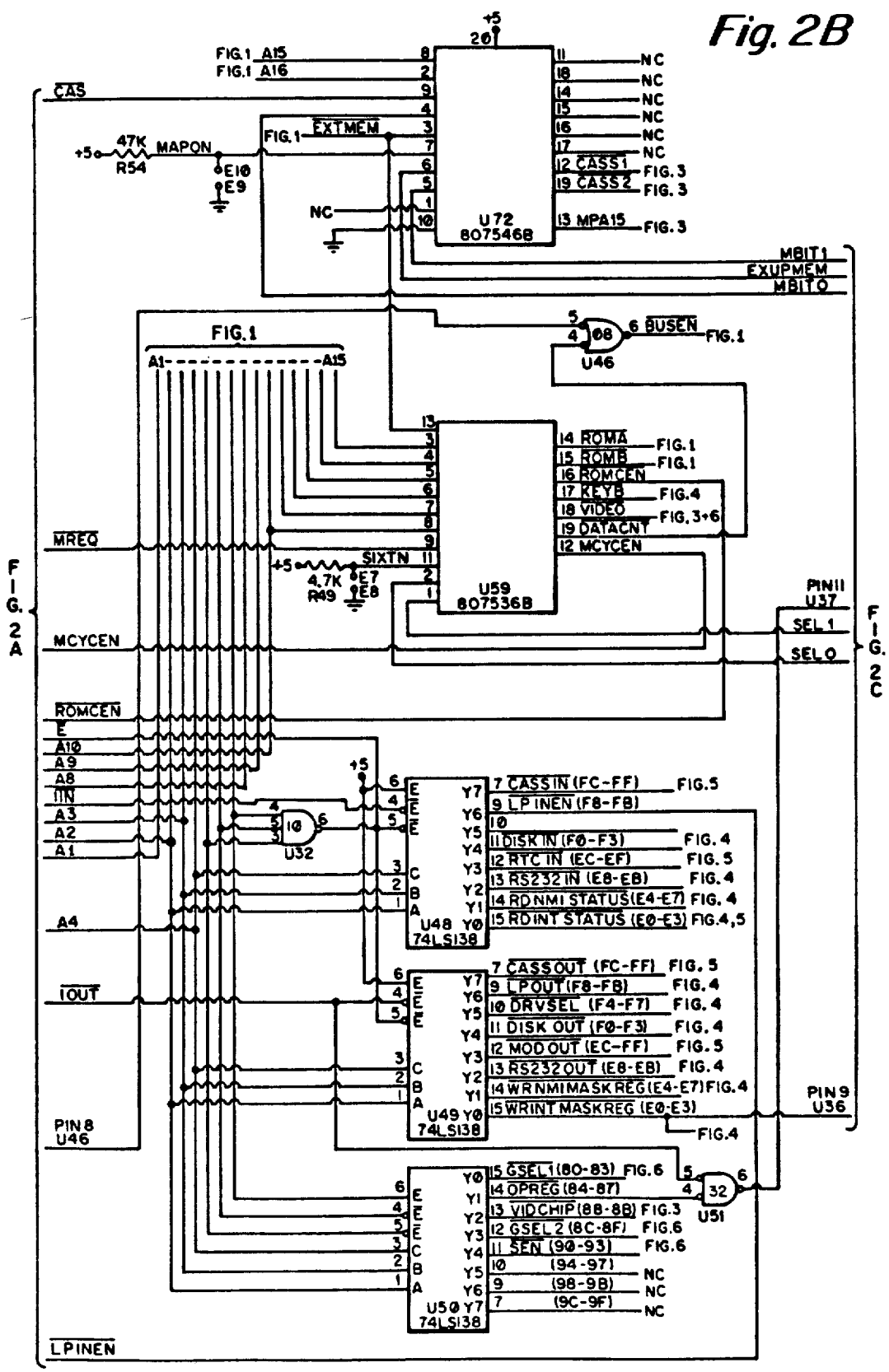
Figure 2C:
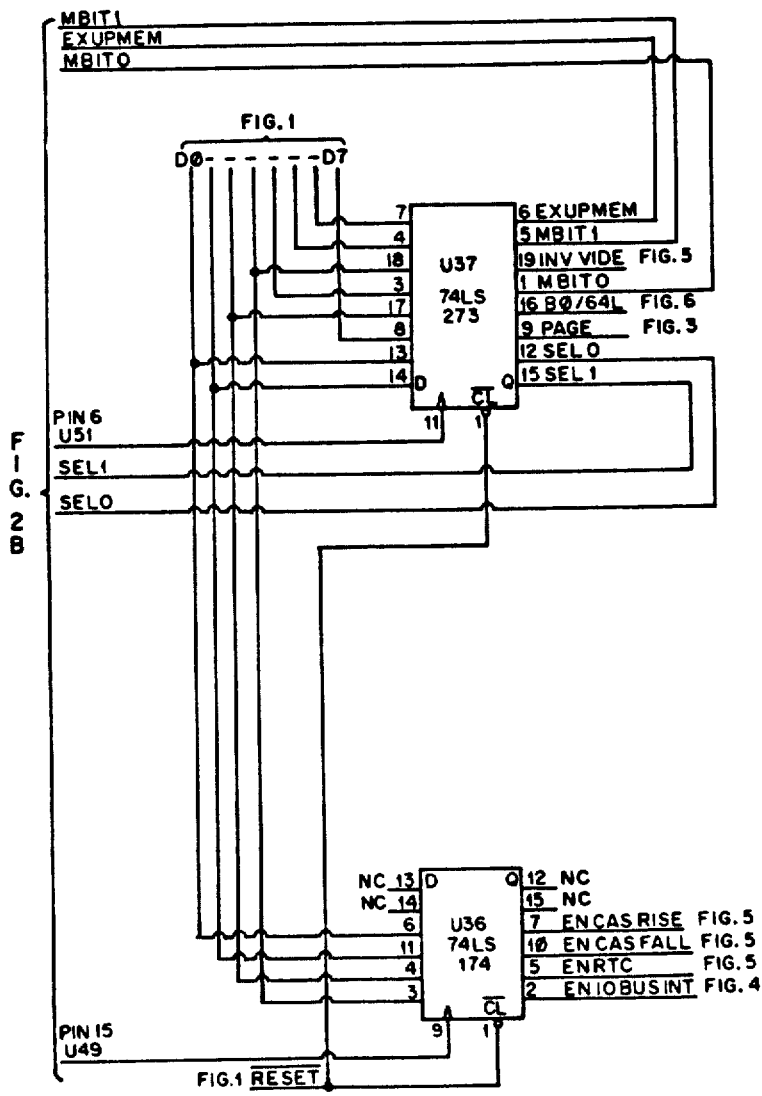

In FIG. 1A, the clock signal to the CPU is buffered by the active pull-up circuit Q3. The RESET and WAIT inputs to the CPU are buffered by gates U17 and U46. Control outputs from the Z80 processor include the signals M1-, RD-, WR-, MREQ- and IORQ-. These signals are sent to the PAL U58 shown in FIG. 2 which combine these into other appropriate control signals. Other than the signal MREQ- which is buffered by device U38, the raw control signals go to no other components and hence require no additional buffering.

The address decoding section is divided into two sub-sections, namely port address decoding and memory address decoding. In port address decoding, lower order address lines are sent to the address and enable inputs of decoders U48, U49 and U50. The decoder U48 is also enabled by the signal IN-, which means that it decodes port input signals, while decoder U49 decodes port output signals. Memory mapping is accomplished by the PAL U59 shown in FIG. 2 in the basic 16K or 64K system. In a 120 K system, the PAL U72 along with the select and memory bit of the option register, also enter into the memory mapping function.

Figure 1B:
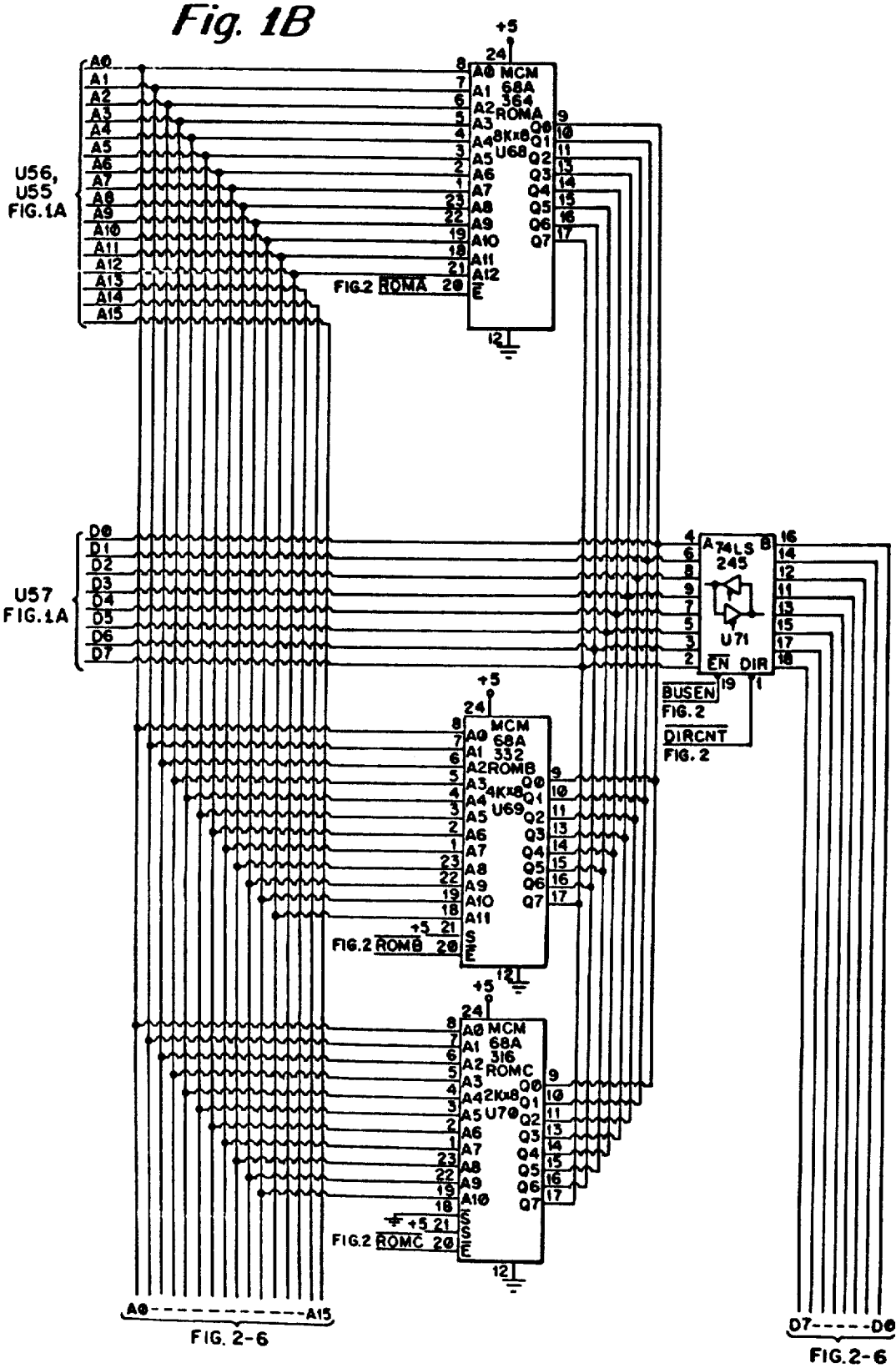

Another component of the microcomputer system is the read-only memory (ROM) shown in FIG. 1B. In the microcomputer system, the ROM is preferably of 14K capacity divided into an 8K ROM, a 4K ROM and a 2K ROM. The ROMS that are used preferably have three-state outputs which are disabled if the ROMS are deselected. ROM data outputs are connected directly to the CPU databus. The ROMS contain a basic operating system, as well as a floppy disk boot routine.

In the overall microcomputer system, the random access memories are available as options in three different capacities including 16K, 64K or 128K of RAM. The 16K option uses memory type 4116. The 64K and 128K options which are described in detail herein use memory type 6665. This type is of 64K by 1 capacity requiring only a single supply voltage.

Figure 3C:
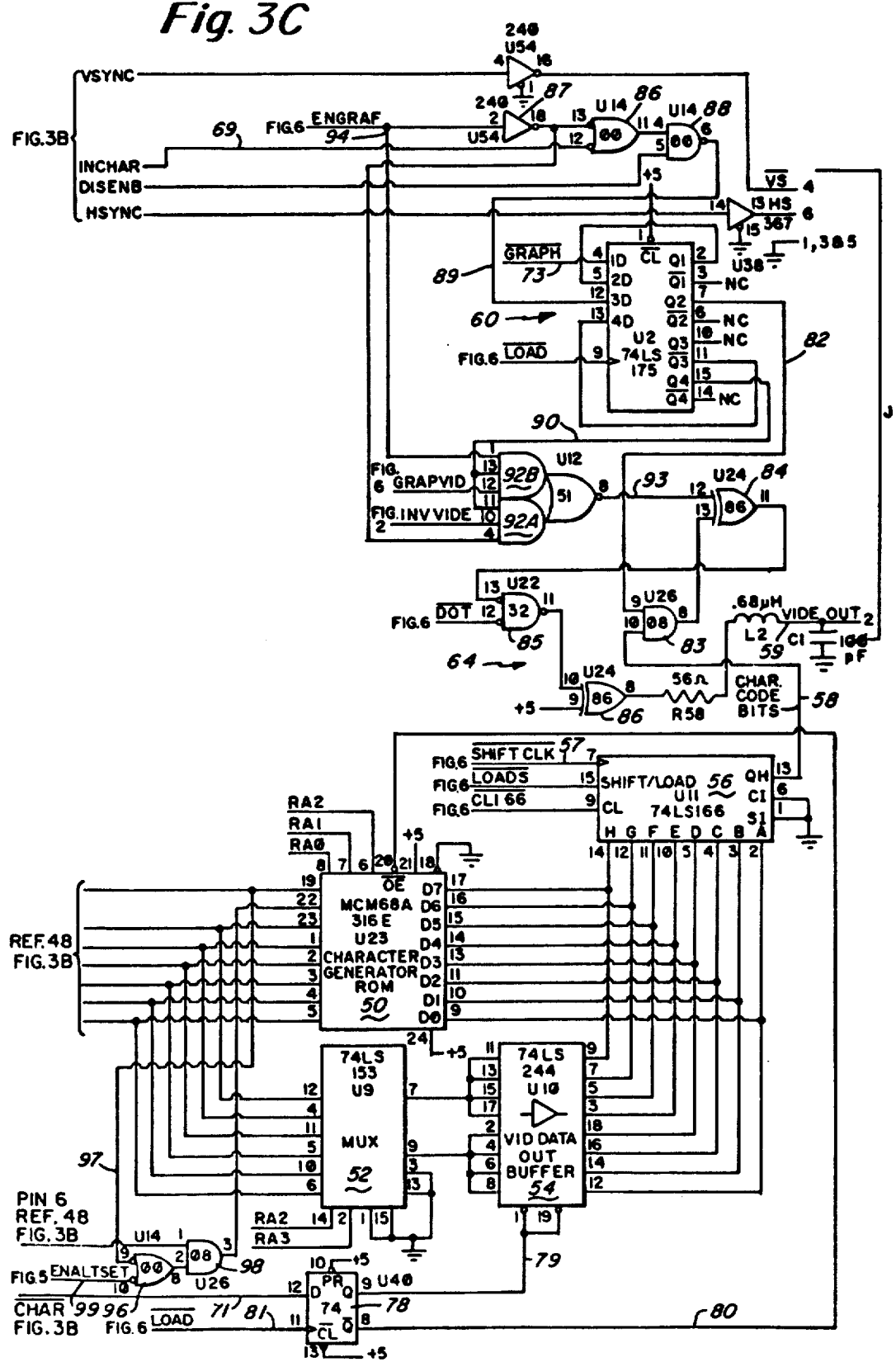
Figure 4A:
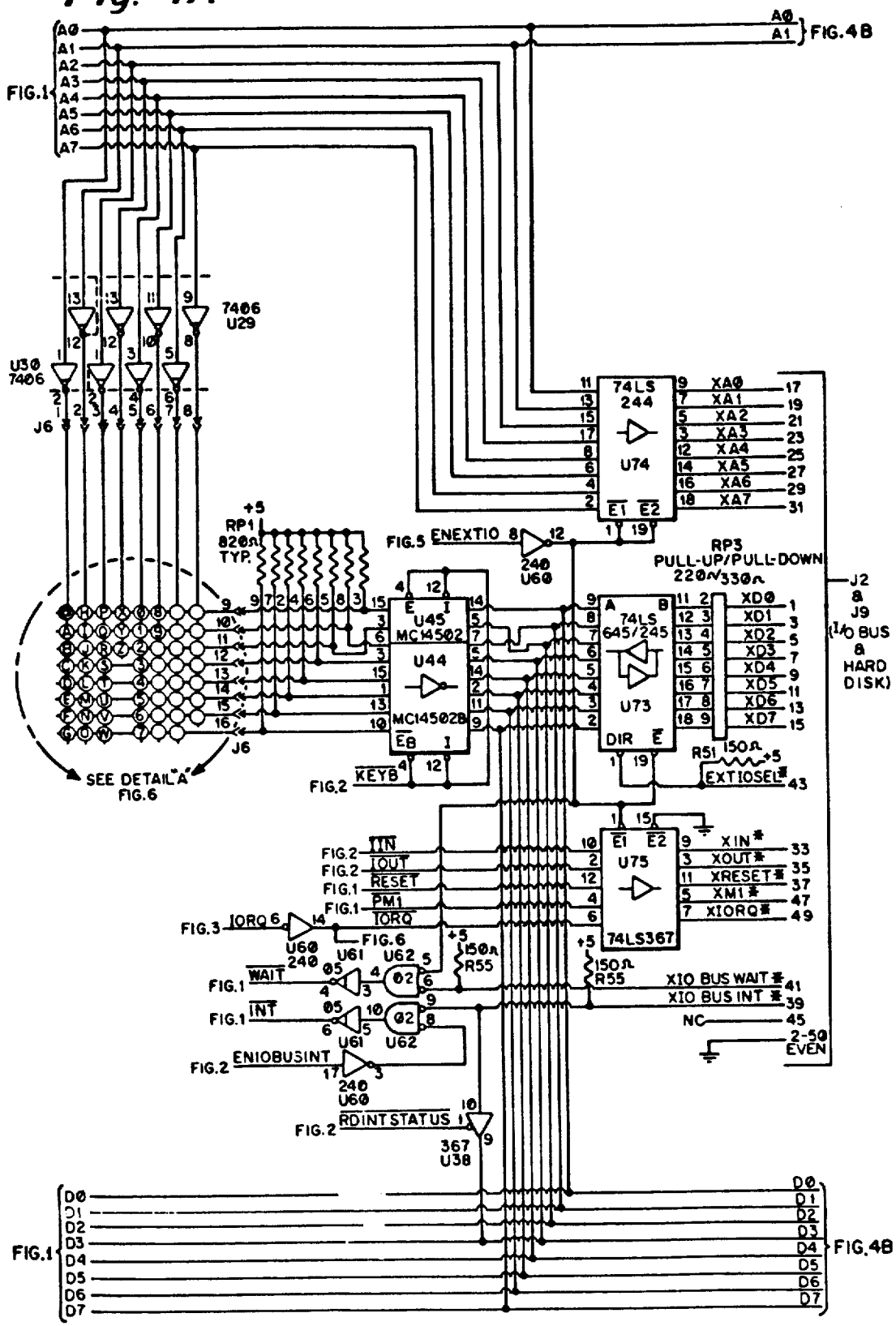
FIGS 4A and 4B show additional timing for the system including keyboard circuitry.
Figure 4B:
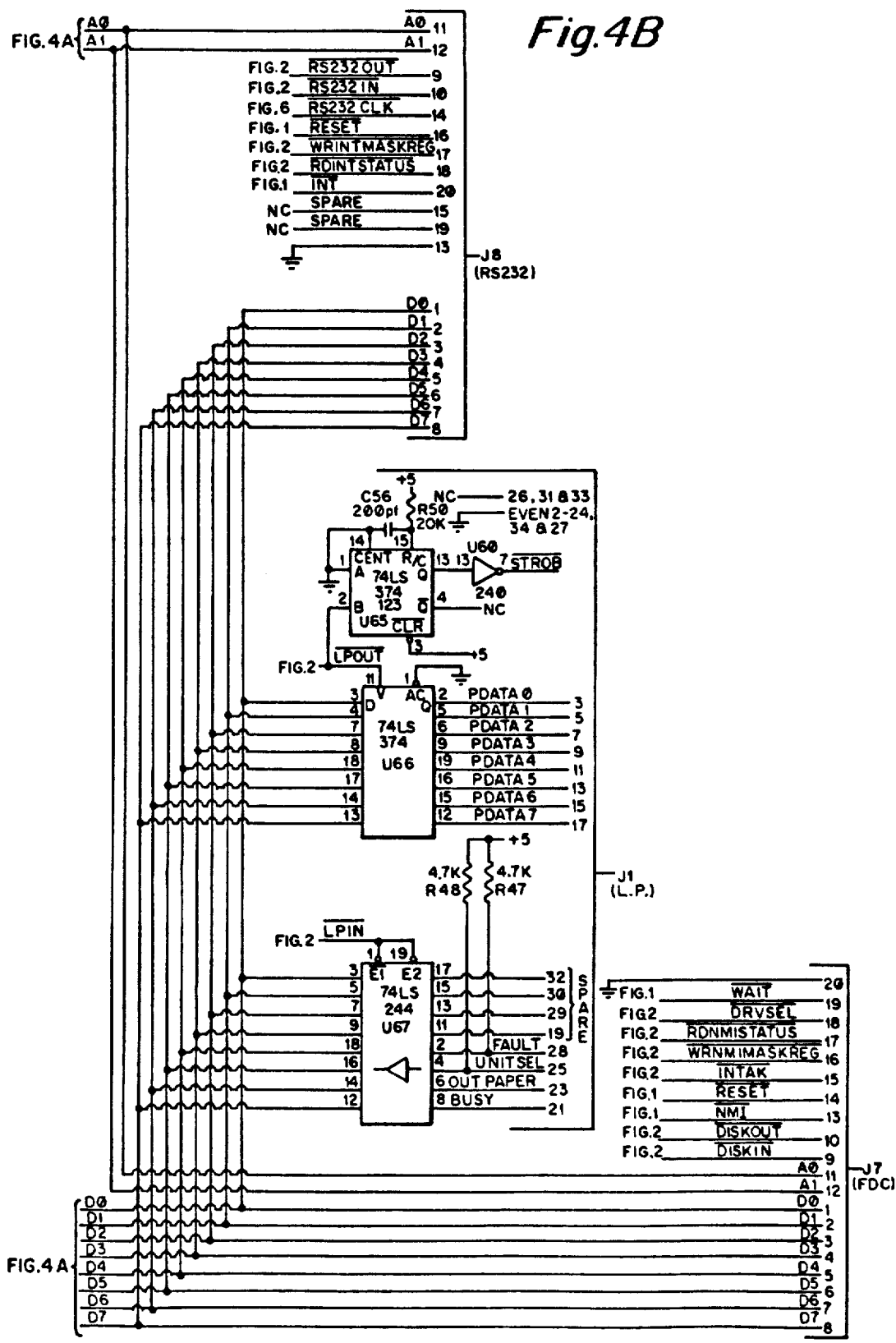
Figure 5A:
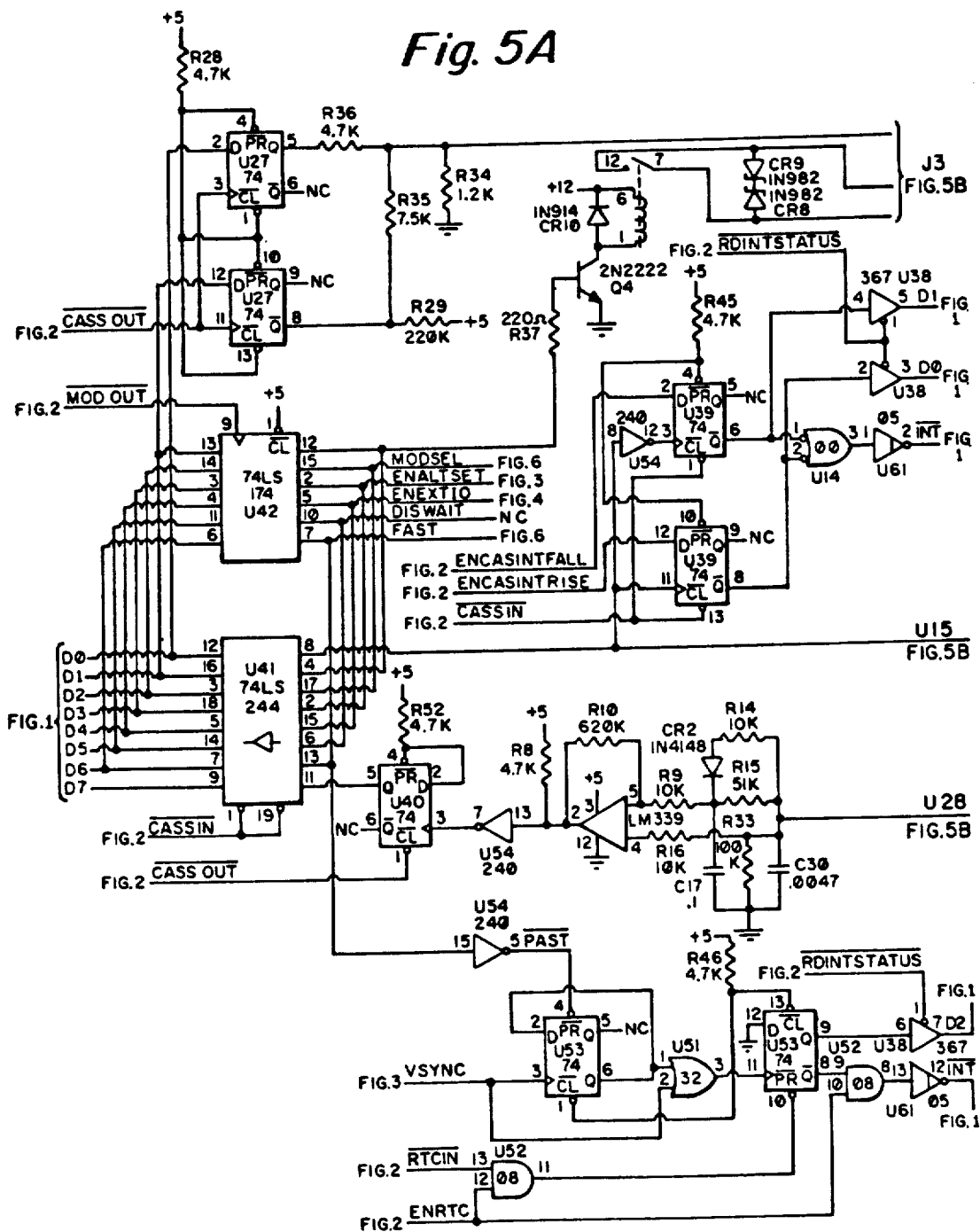
FIGS. 5A and 5B show a portion of the micro computer system including cassette porting.
Figure 5B:
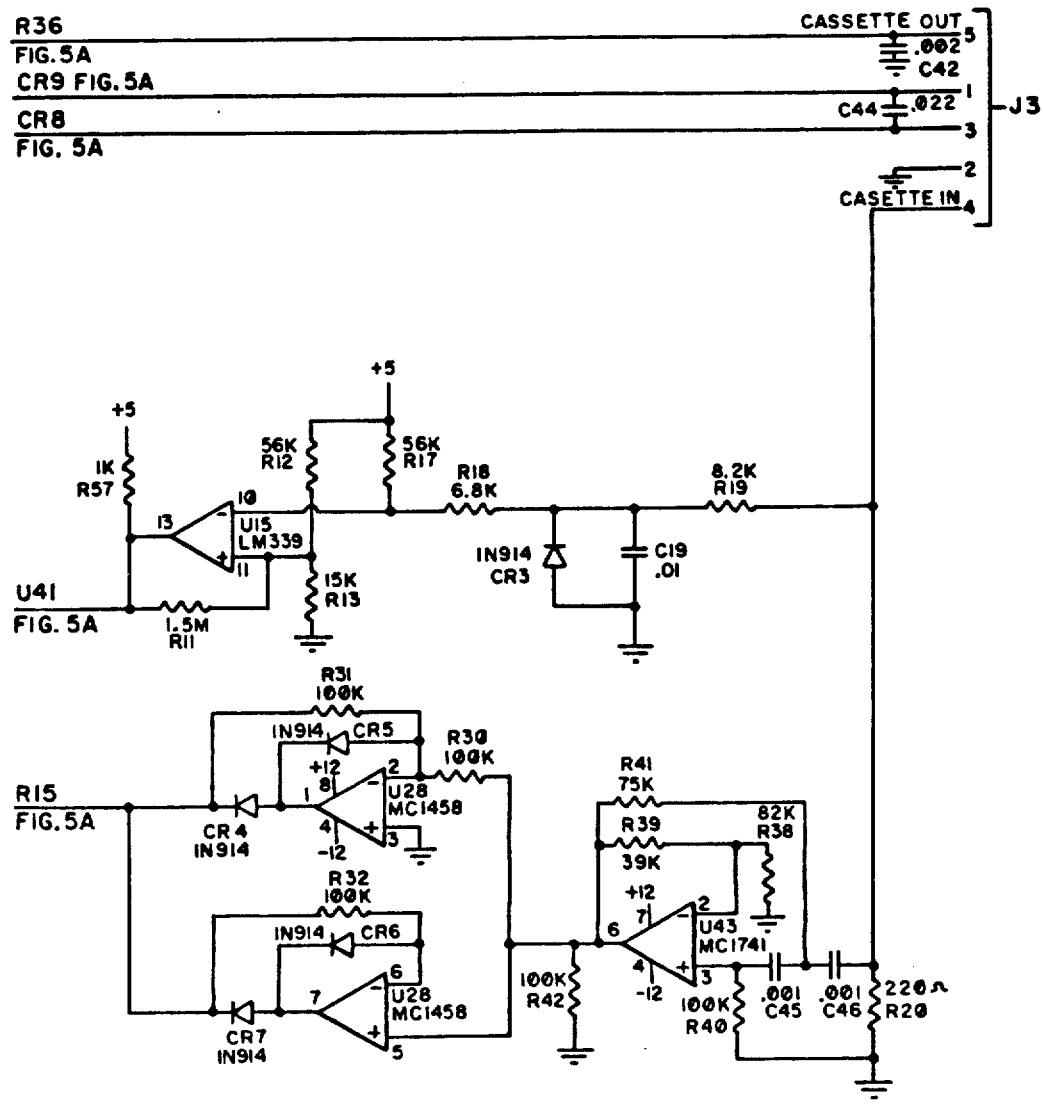

Now, with regard to the drawing, there is shown in FIG. 3A random access memory 10 which is comprises of eight memory units 10-0, 10-1, 10-2, 10-3, 10-4, 10-5, 10-6 and 10-7. Each of these memory units as mentioned previously is of type 6665 having associated therewith input control lines such as lines 12, address lines 14 and output data lines 16. The data outputs from the RAM 10 couple to the databus 18. The databus is identified by the signals D0–D7.

A dynamic RAM as used herein requires multiplexed incoming address lines. This is accomplished by means of circuits 20 and 22. These circuits are each of type 74157 referred to as quad-multiplexers. The four output lines from the multiplexers 20 and 22 connect by way of a resistor array 24 to the address inputs of the RAM. The inputs to the multiplexers 20 and 22 are taken from the address bus 24. The address bus 24 is designated by address lines A0–A15 as noted.

The random access memory 10 is of conventional design in a readily available circuit chip and has signals coupled thereto such as memory read-write signals and memory request signals. Reference has been made hereinbefore to control lines 12. These include a memory read-write signal (MWR) and a row address strobe signal (RAS). There is also provided as shown at the bottom of the RAM 10 a column address select (CAS).

The data lines 16 from the RAM 10 are coupled to the RAM data buffer 26. This buffer ay be of type 74LS244 referred to typically as an octal buffer. The output of the RAM data buffer 26 couples to the databus and cathode ray tube controller 30. For the 128K RAM option, there are two rows of the 64Kby 1 RAM circuits type 6665. The proper row is selected by the signal CAS- shown in the drawing and generated from a programmable array logic (PAL) circuit U72. The output data lines 27 from the RAM data buffer 26 couple as data signals D0–D7 to the cathode ray tube controller (CRTC) 30. The controller 30 is in a sense the heart of the video display circuitry. This controller is of type MC6835. The controller 30 allows two screen formats; 64 by 16 and 80 by 24. Since the 80 by 24 screen requires 1,920 screen memory locations, a 2K by 8 static RAM is used for the video RAM. The 64 by 16 mode has a two-page screen display and a byte in the options register for determining which page is active for the CPU. One offsets the start address of the controller 30 to gain access to the second page 64 by 16 mode. In this connection, note the input control signal on line 32 which is a mode control signal controlling either 64 by 16 or 80 by 24 operation.

The controller 30 as mentioned previously is a conventional circuit that generates all of the necessary timing and control signals associated with video control including addresses for the video RAM 34. The video RAM 34 is of type 4016 and is a 200 nanoseconds RAM of capacity 2K by 8. This is a static RAM. It is noted that the address lines from the controller 30 are coupled in groups to three address multiplexers 36, 38 and 40. These multiplexers are controlled by the CRT clock signal (CRTCLK). Thus, addresses to the video RAM 34 are provided from the controller 30 when the screen is being refreshed and are provided directly from the CPU by way of the address bus 24 when updating the screen data. This alternate control is controlled by the signal CRTCLK which is a bi-level signal that controls the operation. This signal CRTCLK is coupled to pin 1 of each of these multiplexers. Each of the multiplexers 36, 38 and 40 is referred to as a quad multiplexer of type 74LS157. The data lines of the video RAM 34 may be referred to as a video databus 42. This video databus intercouples the video RAM with a video data read latch 44, a video data write buffer 46, and a video output latch 48. The video data read latch 44 is an octal latch of type 74LS373. The video data write buffer 46 is a octal buffer of type 74LS244. The video output latch 48 is an octal flip-flop circuit of type 74LS273. The data transfer between the CPU and the video RAM 34 is latched by the video data read latch 44 whose output connects to the databus 18. Input data passes to the video data write buffer 46 from the databus 18 to the video RAM.

During a screen refresh, the data outputs of the video RAM 34 are latched by the video output latch 48. The outputs from the video RAM 34 are ASCII character codes. These data outputs become the addresses for the character generator ROM 50. The character generator ROM 50 may be of type MCM68A316E. In accordance with the system described herein, there is also provided an alternate display in the form of low resolution graphics. Accordingly, there is provided a data selector 52 and associated video data output buffer 54. The selector 52 may be in the form of a dual multiplexer of type 74LS153. The video data output buffer 54 may be a octal buffer of type 74LS244. The multiplexer or selector 52 receives the data signals from the video output latch and provides two control signals which are coupled in common separately to the video data output buffer 54.

The output of the character generator ROM 50 and the video data output buffer 54 couple in common to the shift register 56 which may be of type 74LS166. There are control inputs associated with the shift register 56 for loading data into the shift register, and shifting data on a clocked basis out of the shift register. The line 58 is the basic video output from the shift register 56.

The inputs to the shift register 56 are the latched data outputs from either the character generator ROM 50 or the cell generator at the video data output buffer 54. The shift clock input on line 57 is a timing signal generated from PAL U4 and is at a frequency of 10.1376 MHz. for the 64 by 16 mode and at a frequency of 12.672 MHz. for the 80 by 24 mode of operation. The serial output from the shift register on line 58 after signal processing to be described hereinafter, becomes the actual video dot information shown at the video output line 59.

Special timing considerations in the video circuitry are handled by means of the latch 60. The latch 60 may be a quad flip-flop of type 74LS175. In this regard, it is noted that there are four input data lines and four pairs of output lines including assertion and negation outputs. This timing or synchronization provided by the latch 60 includes a blanking control originating from the controller 30 and shift register clocking originating from a PAL of the microcomputer system. In accordance with the present invention, additional video control and timing functions, such as sync buffering, inversion selection, dot clock chopping, and graphics disable of a normal video, are handled by logic gating shown on the drawing and to be soon described.

In the drawing, there are two sets of logic including set 62 and set 64. Logic set 62 controls, inter alia, the forementioned video inversion. In this regard, note the signal INVVIDE (inverse video) on line 66 which couples to NAND gate 68 and also inverter 70. The output of the inverter 70 coupled to an AND gate 72. The output of the AND gate 72 in turn coupled to a NAND gate 74. The logic set 62 also includes NAND gate 75 and AND gate 76.

When the mode of operation is not in inverse video, then the line 66 is low and an enabling signal is coupled by way of the inverter 70 to the AND gate 72. The other input to the gate 72 is the dataline D7. It is noted that this also couples to one input of the NAND gate 68. The logic set 62 also receives the dataline signal D6 which it is noted is coupled by way of inverter 75 to one input of the NAND gate 74. The output of the gate 74 by way of line 71 couples to a control flip-flop 78. The flip-flop 78 has its assertion output coupled by way of line 79 to the buffer 54 and has its negation output coupled by way of line 80 to the character generator ROM 50. These outputs of the flip-flop couple to enable inputs of the buffer and ROM. A load timing signal is coupled to the clock input of the flip-flop 78. This signal is coupled on line 81. When the signal on line 71 is high, the flip-flop 78 is set and the low output on line 80 enables the character generator. Alternatively, when the signal on line 71 is low, this causes a resetting of the flip-flop 78 upon occurrence of the clocking thereof and this causes a low signal on the line 79 for enabling the cell generator section by directly enabling the video data output buffer 54.

In accordance with the present invention, there is provided for an inversion of the video (black-to-white and white-to-black). In this connection, refer to the inverse video signal on line 66. When the system is not in the inverse mode of operation, the signal on line 66 is low. This signal is inverted by inverter 70 and couples to the AND gate 72 to enable the gate 72. Assuming that the dataline D7 is also at its high state, then the output of the AND gate 72 is also high. The output from the gate 72 couples to two different locations. This signal couples directly to the video output latch 48 so as to provide, in normal, non-inverted operation, all eight data bytes from the video output larch 48 to the character generator 50. The signal from the gate 72 also couples to the NAND gate 74. Now, the data line D6 which couples to the inverter 75 has its state establish whether one is generating graphics or characters. For graphics the data bit D6 is low and for characters the data bit D6 is high. Assuming that the data bit D6 is low for graphics, then the inverter 75 causes two high inputs to occur at the gate 74 thus causing a low output therefrom. The output from the gate 74 couples to two different places. The output of this gate couples by way of the aforementioned line 71 to the flip-flop 78 and this output from gate 74 also couples to NAND gate 75. This low level signal at the output of gate 74 provides a high signal at the output of gate 75 and also a high at the output of gate 76. The output of gate 76 at line 73 is shown coupling to the latch 60. The latch 60 forms a synchronizer providing predetermined delays so that all operations on the character are synchronized at the output video. The signal on line 73 entering the latch 60 is delayed at the output line 82. This signal couples to the AND gate 83. The AND gate 83 also receives on its line 58 the direct character code bits from the shift register 56.

Now, as mentioned previously, the output of gate 76 is high and this high level signal, delayed by the latch 60 is coupled to the gate 83. This forms an enabling signal so that the character code bits on line 58 pass directly through the gate 83 to the exclusive OR gate 84. The character code bits are capable of passing by way of the gate 84, by way of NAND gate 85 and inverter 86 to the output video line 59. The gate 85 has inverted sensing inputs. The gate 86 is shown as an exclusive OR gate but is logically an inverter having one of its inputs permanently connected to a voltage high. The output on the video line 59 is the dot pattern for generating graphics and characters on a line-by-line basis on the screen at a typical raster scan rate.

The low output from the gate 74 also couples by way of line 71 to the flip-flop 78 and upon clocking of the flip-flop, it is reset so that the output on the line 79 goes low thus enabling the video data output buffer 54 for enabling data transfer from the cell generator rather than the character generator. The high signal on line 80 from the flip-flop 78 causes a disabling of the character generator ROM 50.

Now, assuming that the data bit D6 is high which is to indicate character generation rather than graphics or cell generation, this signal is inverted by the inverter 75 providing a low input to the gate 74 which in turn is inverted by the gate 74 to provide a high output. This high output signal from gate 74 couples by way of line 71 to the flip-flop 78 so that upon occurrence of the next clock pulse at line 81, the flip-flop 78 is set, assuming that it had been previously reset. The setting of the flip-flop 71 causes a low signal on line 80 for enabling the character generator ROM 50. The signal on line 79 from the flip-flop 78 is high and disables the cell generation portion of the circuit or in particular it disables the video data output buffer 54.

The high output from the gate 74 also couples to the gate 75. The other input to gate 75 is the signal RA3 which is a row select signal from the cathode ray tube controller 30. This gate 75 is used for blanking to provide a blanking signal between character rows. Thus, when blanking is to occur, the signal RA3 is high and the output of gate 75 low. This low level signal is passed by way of line 73 to the latch 60. The delayed signal is coupled by way of line 82 to the gate 83. This low level signal inhibits the gate 83. Thus, the character code bits on line 58 coupled to gate 83 are blanked by virtue of this inhibit signal delayed so as to be properly synchronized by means of the synchronizing latch 60. In this connection, with regard to the latch 60, it is noted that a line intercouples the output of the first flip-flop at output Q1 to the data input 2D of the second flip-flop. It is the output Q2 from the second flip-flop of the latch that couples by way of the line 82 to the AND gate 83.

When the signal RA3 is not high, which is during a character space and not between characters, then the output of gate 75 is low and there is a low level signal coupled on line 73 by way of the first two stages of the latch 60 so that the signal on line 82, properly synchronized, is a high level signal which enables the gate 83 and permit passage of the character code bits from line 58 by way of gate 83 to the exclusive OR gate 84.

In this mode of operation just discussed, it has been assumed that the signal on line 66 is low because there is not video inversion. It is noted that this low level signal coupled to the gate 68 maintains the output of the gate 68 at its high state. This signal couples by way of line 69 to one input of the OR gate 86. The inputs to the OR gate are inversion inputs. Associated with the gate 86 is also an inverter 87 and a NAND gate 88. It is noted that the output of the NAND gate 88 couples by way of line 89 to the two latter stages of the latch 60. Line 89 couples to the 3D input of the latch. It is noted that the Q3- output from the latch couples back into the fourth date input 4D and the output t Q4 couples by way of line 90 to gate 92.

The inputs to gate 86, look for low level signals. Thus, when the signal on line 69 is at its high level and when one is not enabling external graphics, then the output of the gate 86 is low. This low level signal is inverted by the gate 88 to a high level signal on line 89. A further inversion occurs in the latch 60 and thus the signal on line 90 is low, thus disabling both sections of the combination AND and NOR gate 92.

Thus, when the output of gate 68 is high because we are not in inverse video, the signal on the line 69 is essentially an inhibiting signal. However, or video inversion, the signal on line 66 goes to its high state. First, this signal couples by way of gate 70 to AND gate 72 to inhibit the gate 72 so that it has a low output. This low output is coupled to the video output latch 48 so that the data bit D7 is always at a low state. This low level signal also couples to gate 74 so as to provide a high output from gate 74. This high output signal from gate 74 couples on line 71 to cause a setting of the flip-flop 78. In this state, the line 80 is low and thus the character generator is enabled. The high level signal from NAND gate 74 also couples to the NAND gate 75 and provides operation as previously mentioned for providing blanking between character rows. As indicated previously, this is under control of the signal RA3 from the cathode ray tube controller 30.

The inverse video signal on line 66, when at its high state, also couples to gate 68 and assuming that the other input to the gate 68 is also high, then the output from 68 goes low. This low going signal on line 69 is indicative of character inversion. This signal is coupled to gate 86 for causing a high output therefrom which is inverted by gate 88 as long as the display enable signal is present at the other input of the gate. This provides a low output signal from the gate 88 which couples to the 3D input of the latch 60. It is noted that the interconnection from the third to the fourth stage is taken at the negation output Q3- and thus the output at line 90 is a high level signal coupling to the gate 92. for causing enabling thereof. However, it is only the lower gate 92A that is enabled because the inverse video signal is present and also the graphics is not enabled and thus the output from gate 87 is high. The enabling of gate 72 provides a low output therefrom which couples to one input of the exclusive OR gate 84. Thus, in the video inversion mode of operation, the signal on line 93 is low whereas for non-inversion, this signal is high. This has the effect of inverting the character code bits at the output of gate 83. Under non-inversion conditions, the line 93 is high and for inversion the line 93 goes low.

The latch 60, as mentioned previously, is used primarily for synchronization and it is noted that there is a delay provided between the output of the gate 88, and the signal on line 90 coupled to the gate 92. This allows for the proper synchronization between the data presented to the shift register and the occurrence of the inversion signal.

In the drawing there is also shown the signal ENGRAF on line 94. This signal couples directly to the gate 92B and also by way of the inverter 87 to the gate 92A. When external graphics is being enabled the character code bit from gate 83 are essentially overlayed by means of an input graphic control signal referred to as the signal ENGRAF. When this is present, the gate 92B is enabled instead of the gate 92A and as long as the signal GRAFVID is present, then there may be a low signal on line 93 for providing inversion. This type of control is possible on a character-by-character basis or bit-by-bit (cell-by-cell) basis.

There are also provided, two other gates identified as OR gate 96 having inverted inputs and AND gate 98. One input to the gate 96 is the data line D7. The other input to the gate 96 is the signal ENALTSET on line 99. When this signal on line 99 is present, this signals the generation of an alternate character set from the character generator ROM. The alternate character set provides additional characters above the normal characters that are used. In this connection, when the inverse video signal is high, bits 0–127 represent normal characters, and bits 128–255 represent inverse video characters. If the inverse video signal is low and the alternate set signal is low, then bits 0–127 are normal characters, bits 128–191 are graphics and bits 192–255 represent a kana character set. If the inverse video signal is low and the alternate character set signal is high, then bits 0–127 are normal characters, bits 128–191 are graphics and bits 192–255 are alternate set characters.

When the signal on line 99 is absent, because an alternate set is not being enabled, then the output of gate 96 is high and this enables the gate 98. The gate 98 is enabled regardless of the state of the signal on the line 97 which is the date line D7. Thus, for normal character generation, the data bit D6 simply passes without inversion through the gate 98 to the corresponding D6 input of the character generator ROM 50.

When the signal on line 99 goes high to indicate an alternate set, then the control of the gate 96 is primarily from the line 97. If the date line D7 is high, then the output of gate 98 is low and thus the data bit D6 to the character generator is low. On the other hand, if the date bit D7 is low, then the data bit D6 from the output video latch simply goes directly by way of the gate 98 to the D6 input of the character generator ROM 50. Thus, for alternate set operation, the outcome is that the higher order data bits are presented to the character generator ROM 50 for display of what may be termed special characters.

Figure 6A:
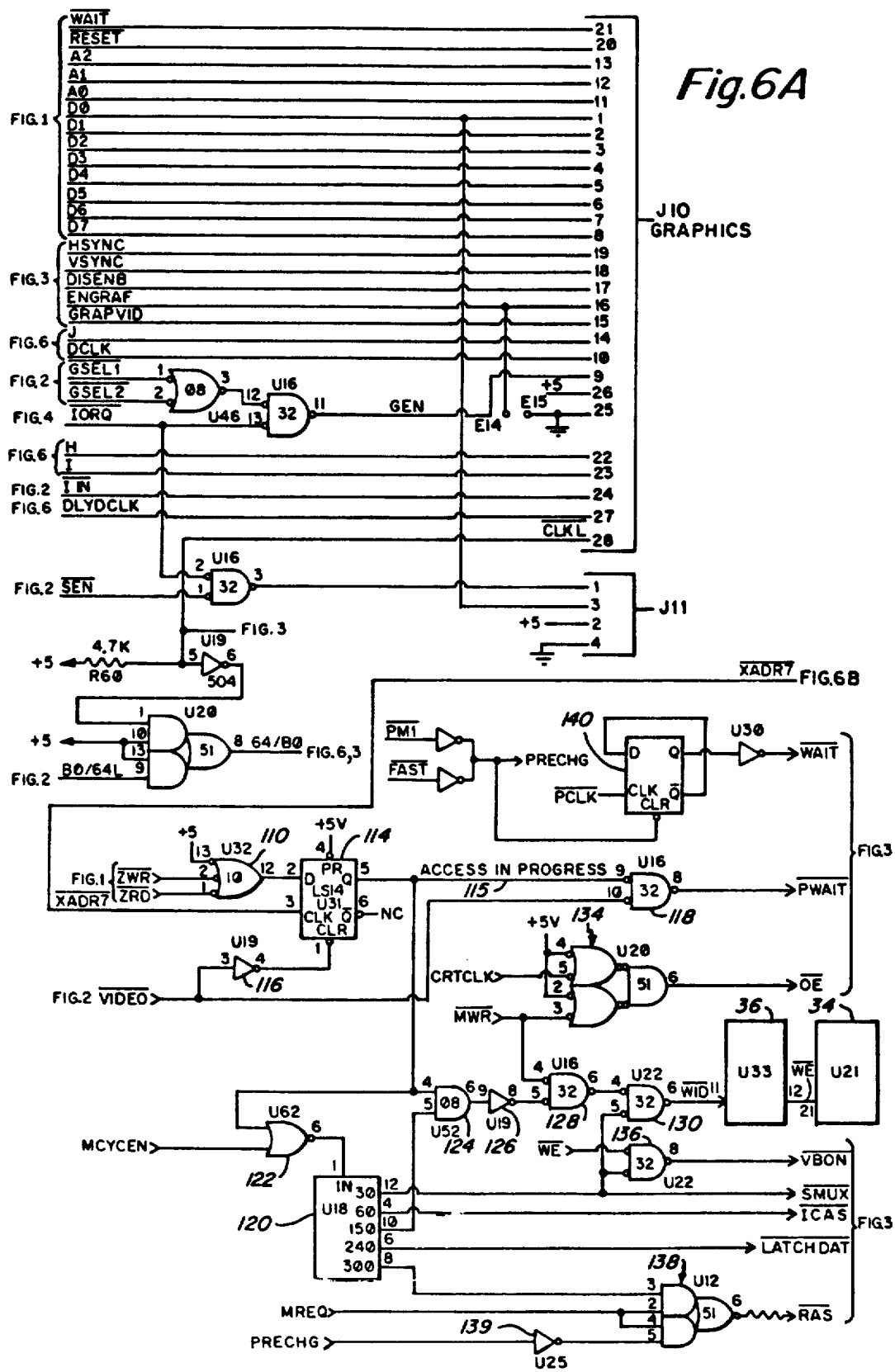
Figure 7:
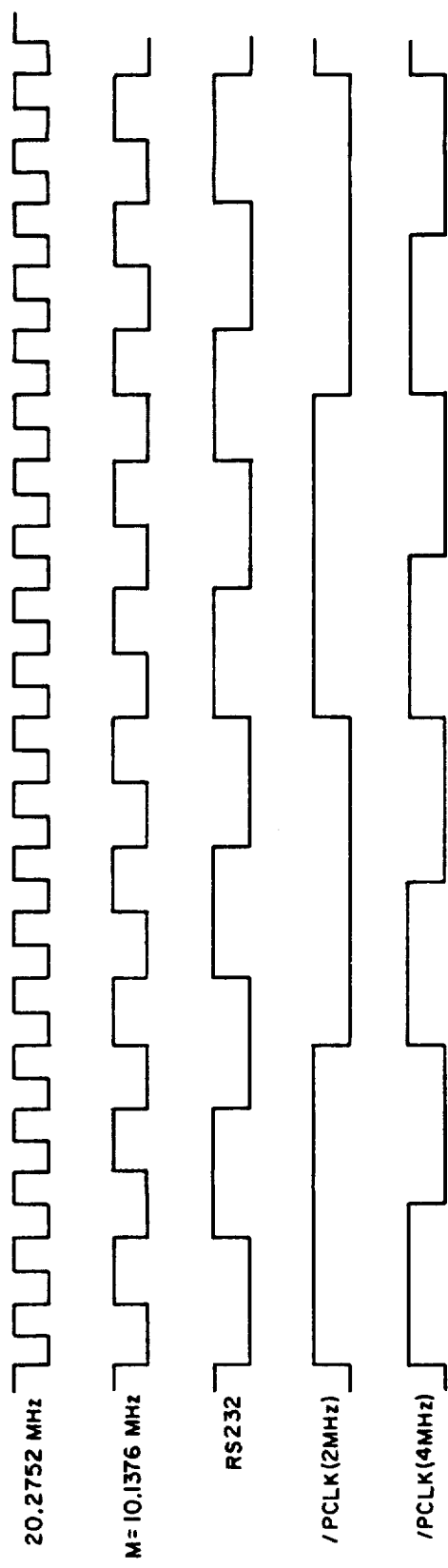
FIG. 7-9 show timing diagrams associated with the micro computer system shown in FIG. 1-6.
Figure 8:
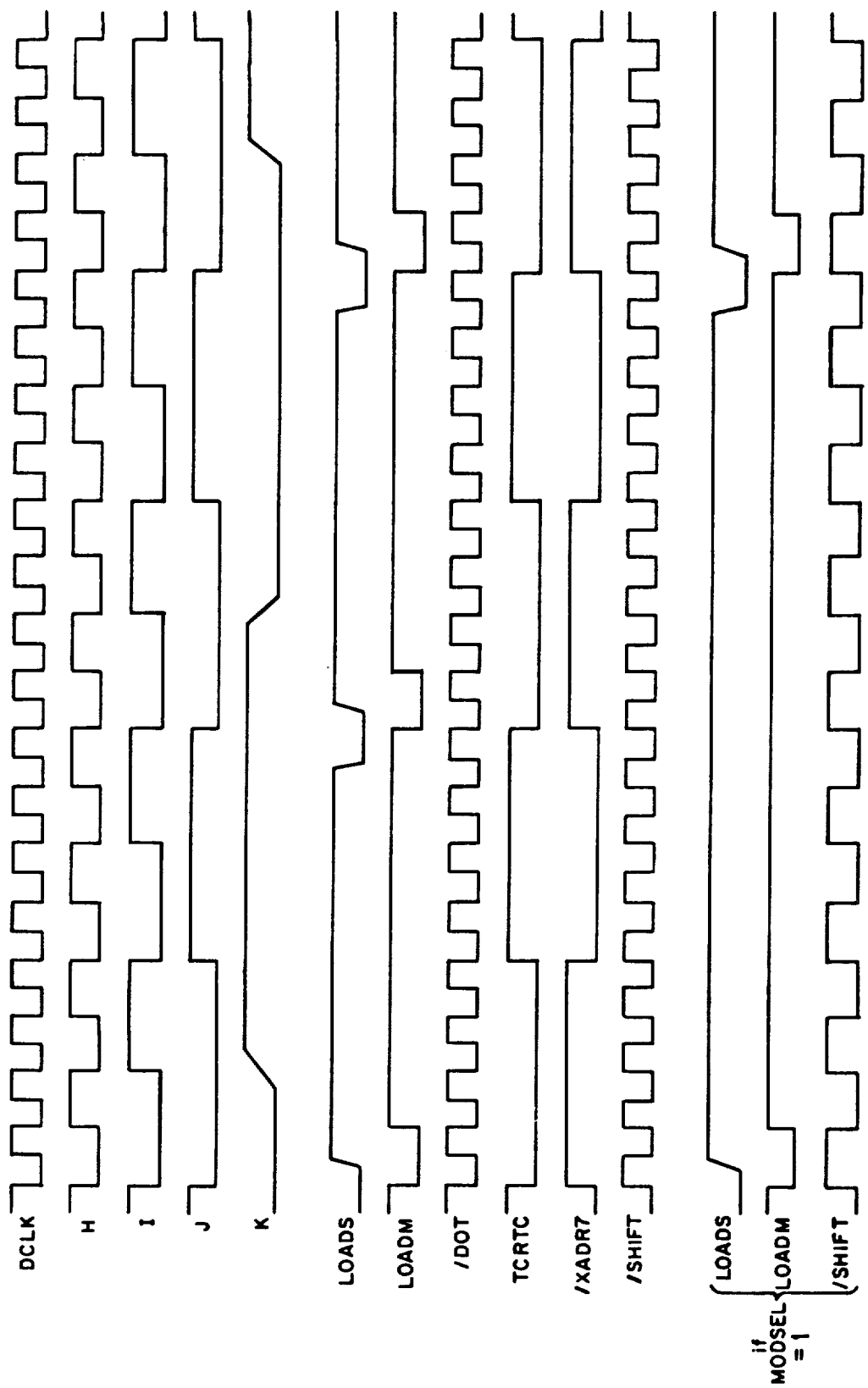
Figure 9:
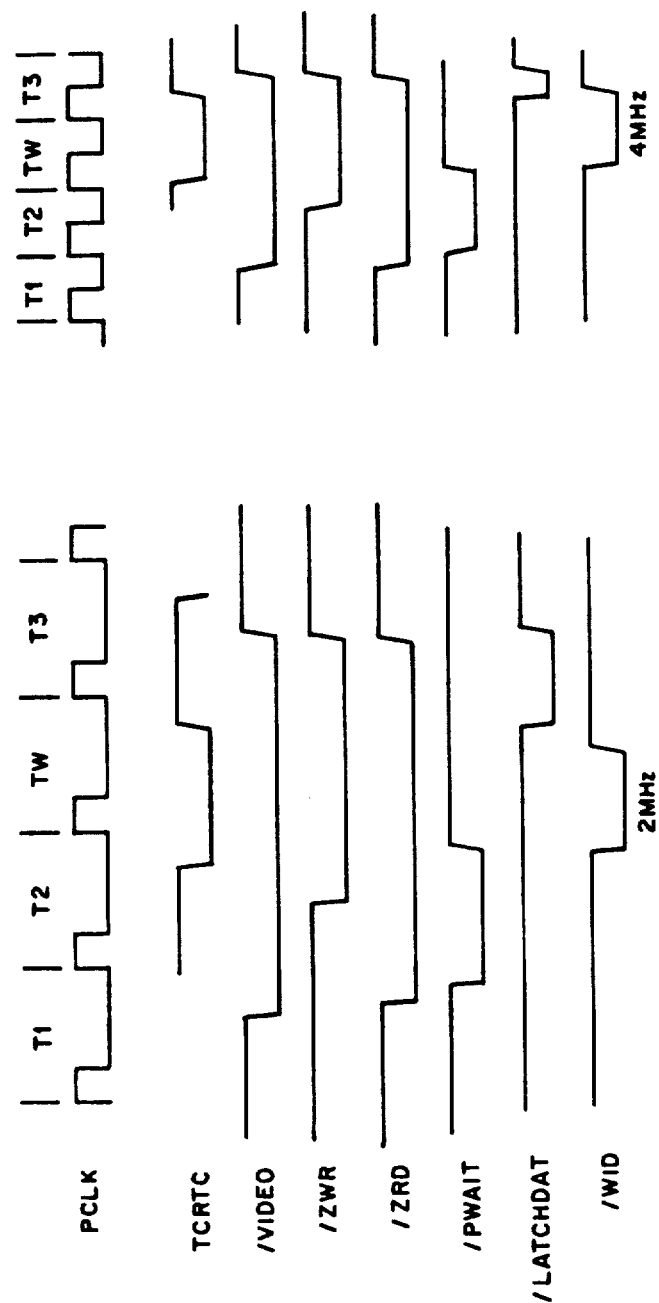

Reference is now made to FIG. 6A and 6B which shows the generation of timing signals in connection with timing for memory access in connection with the microcomputer system. The timing control shown in FIGS. 6A and 6B the generation of timing signals for the random access memory of FIG. 3A as well as timing signals for the video RAM. In this connection, reference is made to FIGS. 3A and 3B shows the main memory 10 and the video ram 34.

In FIGS. 6A and 6B the signals that have to do with the timing for the random access memory include the signals SMUX-, RAS-, and ICAS-. The timing signals that relate to the video RAM include the PWAIT-, OE-, WID-, VBON-, and LATCH DAT-.

FIG. 6A and 6B also shows the number of input signals, many of which originate from the central processing unit, which in the preferred originate from the central processing unit, which in the preferred embodiment, is a type Z80 processor. Also shown in FIGS. 6A and 6B is part of the circuitry of FIGS. 3A and 3B shown in block form. This part includes the multiplexer 36 and the video RAM 34. It is the signal identified in FIGS. 6A and 6B as the signal WID- that is coupled to pin 11 of the multiplexer 36. This is a window signal for providing a window for writing to the video RAM.

Read and write signals are coupled directly from the Z80 processor and are identified FIGS. 6A and 6B as signals ZWR- and ZRD-. These two signals couple to the gate 110. The output of the gate 110 couples to the data input of the flip-flop 114. The clocking of the flip-flop 114 is from the signal XADR7-. This signal is basically an inversion of the signal CRT CLK shown and discussed in connection with FIG. 3A. The clearing of flip-flop 114 is from the signal VIDEO- by way of the inverter gate 116. The signal VIDEO- also couples to one input of the gate 118 to assert RWAIT-. The assertion output of the flip-flop 114 couples to the other input of the gate 118. The setting of the flip-flop 114 indicates video access in progress. Since it is known that the video access is now in progress, the signal PWAIT- is released. The output of flip-flop 114 also enables gate 124 and by way of gate 122 starts the timing of the delay line 120. The setting of flip-flop 114 occurs upon either a read or write signal from the central processing unit passing by way of the gate 110 with a high level signal at the output thereof for presentation to the flip-flop 114.

The output signal from gate 118 is the signal PWAIT- which couples back to the central processing unit. This signal functions as a wait line for the Z80 processor. This action is utilized by the Z80 processor to synchronize to asynchronous signals.

FIG. 6A also snows a delay line 120 which has an input from the NOR gate 122. One input to the gate 122 is the output of flip-flop 114 and the others to the gate 122 is the signal MCYCEN which is a memory cycle enable signal. This is generated through logic from the central processing unit and is for enabling the memory cycle. The delay line 120 has a series of taps that provide for different timing functions with different predetermined delays used to carry out controls of the signals particularly for control of the random access memory 10 and the video RAM 34 shown in FIG. 3A and 3B.

The gate 118 which generates the signal PWAIT- is connected so that the signal is present when the signal VIDEO- occurs but terminates upon the setting of the flip-flop 114. It is noted that the output of the flip-flop 114 also connects to the gate 124. The gate 124 is instrumental in control of the video window. While the output of gate 124 is high, the output at inverter 126 is low and this provides one input enable to the gate 128. The other input to the gate 128 is the signal MWR-. If the system is in a write cycle, then the gate 128 is enabled and has a low output. This in turn enables gate 130. This is the signal that is coupled to the multiplexer 36.

The access in progress signal on line 115, as mentioned previously, has a line that couples to the NOR gate 122. The output of the NOR gate 122 couples to the delay line 120. This access in progress signal on line 115 essentially starts the delay line 120 and upon receipt of a low going signal at the pin 12 of the delay 120, the gate 130 is enabled. The dispersed output of the delay line 120 is a 30 nanosecond tap. Thus, the first tap of the delay line essentially starts the video window at the gate 130. This signal identified as the signal SMUX- also couples to gate 136 and provides the video buffer on signal identified as signal VBON-. This is for enabling the video buffer 46, as noted in FIG. 3B. This occurs when the signal WE- is low.

The second signal from the delay line at tap 60 is a signal ICAS-. The delayed pulse travels down the delay line to the third tap which is tap 150 which couples to a second input of the AND gate 124. When the signal at pin 10 goes low this essentially ends the video window. This low signal provides a high output to pin 4 of gate 130, thus terminating the window signal with the signal WID- going high. This brings the signal WE- high and concludes the right cycle to the video ram. This also disables the signal VBON- which in turn turns off the video buffer 46.

With conclusion of the write cycle there is still a pulse progressing down the delay line 120. One can now assume that there is a read sequence. At the commencement thereof the signal OE- is still low and thus the video RAM 34 is not enabled. At the 240 tap at pin 6 of the delay line there is then provided the signal LATCH DAT-. This low signal as indicated in FIG. 3 couples to the line 45 thereby latching data from the video data bus 42 to the data bus 18. This is for reading data from the video data RAM to the CPU. The data is held in the latch 44 until the signal VIDEO- terminates. It is noted that this action by way of the inverter 116 clears the flip-flop 114 and in turn resets the circuit for further operation.

In FIG. 6A the signal MWR- as mentioned previously is instrumental in not only control of the gate 128 but also in generating of the signal OE- which is the output enable signal for the video RAM 34. In this connection the gate set 134 also receives the signal CRT CLK and the output therefrom is the aforementioned signal OE-. The signal CRT CLK is an alternating signal and depending upon the state thereof, there is essentially an interlacing between control from the cathode ray tube controller (CRTC) 30 or the address lines from the central processing unit (CPU). When the signal CRT CLK is high, then the multiplexers 36, 38, and 40 provide control from the CRTC 30. The address lines are presented from the cathode ray tube controller 30 and the write enable input to the video RAM is held enabled. The signal OE- is also at a state that provides an output enabling of the video RAM. In fact, the output of the gate set 134 has only one condition that brings its output high and that is when the signal CRT CLK is low and during a write cycle as controlled by the signal MWR-. Thus, during a CPU write cycle, a window is established by the signal WID- and data is written by way of the video data write buffer 46 into the video RAM 34.

FIG. 6A also shows additional logic control such as the gate 136 which is used for generating the signal VBON-. As indicated previously, this signal is used in the control of the video data write buffer 46. There is also provided a second gate set 138 that generates at its output the signal RAS-. This signal is used in connection with control of the random access memory shown in FIG. 1. The inputs to the gate set 138 are from the tap 300 delay line 120 and also from the signal PRECHG coupled by way of the inverter 139. The other input signal to this gate set is the Z80 signal for a memory request, namely signal MROQ. It is noted that the delay line 120 also generates on a properly timed basis, the signal ICAS- and the signal SMUX- for the dynamic RAM timing.

FIG. 6A also shows the generation of the signal WAIT- from the flip-flop 140. This signal is coupled to the central processing unit and is another one of the WAIT functions for the control of the Z80 processor.

With regard to the control in accordance with the present invention, reference is made to FIGS. 3A and 3B and the video RAM 34 and also to the cathode ray tube controller 30. The central processing unit address lines couple to the three multiplexers 36, 38, and 40. The control input to each of these multiplexers is at the input pin 1. This control is the signal CRT CLK. This is an alternating signal which, it is noted, is also coupled to the cathode ray tube controller 30. This is the basic clock for the controller 30 for screen refresh but also functions to permit reading from and writing into the video RAM under CPU control.

Thus, when the signal CRT CLK is high, this conditions the multiplexers 36, 38, and 40 to bring addresses directly from the cathode ray tube controller 30. These are shown in FIG. 3B as the B1-B4 addresses which couple to the output line Y1-Y4. This control is for refreshing of the display. Thus, during this state of the signal CRT CLK, the video RAM data is read out into the video output latch 48 and to the character generator ROM 50. The latch 48 latches this data on its portion of the CRT CLK signal or in other words when this signal is high. This provides for a refreshing of the screen and yet, as described hereinafter, data transfer is capable of occurring between the CPU and the video RAM in an interlaced manner on the alternate cycle of the CRT CLK signal so as to enable updating.

Now, when the signal CRT CLK goes to its low state, it is during this low condition that data can be read from the video RAM to the CPU and data can also be written into the video RAM from the CPU. In this regard, the video data read latch 44 and the video data write buffer 46 are used in this control. When the signal CRT CLK goes low then the control of the multiplexers 36, 38, and 40 changes so that the addresses A1-A4 couple to the outputs Y1-Y4. These addresses couple directly from the CPU address bus With the exception of one Of the inputs which is the signal WID- which connects by way of the multiplexer 36 to the input WE- of the video RAM. During this phase of operation this is where the signals VBON- and LATCH DAT- previously referred to in connection with FIG. 6A are instrumental in providing data transfer either on a READ sequence or a WRITL sequence.

If one first assumes that the control is such that it is a write cycle, then the signal VBON- enables the video data write buffer and data is written into the video RAM. Under this condition, the signal OE- is high and thus the output of the video RAM is disabled because it is being written into. This control is provided by way of the gate set 134 of FIG. 6A.

In the sequence of operation, one can then assume that the signal CRT CLK then reverts to its high level and the addresses to the video RAM then switch again to the cathode ray tube controller 30. There is thus a continuous refreshing of the video RAM data under control of the CRT CLK. When the signal then reverts again to its low state, during a subsequent read cycle, the video data write buffer 46 is disabled and the video data read latch 44 is enabled. Data may then be read from the video data bus 42 by way of the video read latch 44 to the CPU data bus.

Thus, there is provided for a read and write sequence with regard to the video RAM, not during any blanking sequence, but actually interleaved with the video RAM refreshing cycle.

There is also described herein tables showing the design for a number of PAL's used in the micro computer system along with mapping equations.

What is claimed is:

1. In a microcomputer system, a video controller comprising:
   a video memory means for storing video character codes and including means for controlling writing into and reading therefrom and means defining a memory address and memory data,
   a video data bus couple to said video memory means,
   a central processing unit address bus and data bus,
   a cathode ray tube controller means having address lines,
   multiplexer means having first and second input sets, an output set, and one and other states,
   means coupling the central processing unit address bus to the first input set,
   means coupling the central processing unit address bus to the first input set,
   means coupling the cathode ray tube controller means address lines to the second input set,
   means coupling the output set to the video memory means address input,
   a video data read latch means coupling from the video data bus to the central processing unit data bus, and control means for controlling the multiplexer means and whereby in one state thereof the video memory means is addressed from the cathode ray tube controller means and in the other state thereof the video memory means is addressed from the central processing unit.

2. A video controller as set forth in claim 1 wherein said video data read latch means comprises read/write buffer means.

3. a video controller as set forth in claim 2 including a video data write register and means coupling the video data write register from the central processing unit data bus to the videodata bus.

4. A video controller as set forth in claim 3 including video output latch means and means coupling the video output latch means to the video data bus.

5. A video controller as set forth in claim 4 including character generator means coupled from said video output latch means.

6. A video controller as set forth in claim 5 including cell generator means and means coupling the cell generator means and parallel with the character generator means with the cell generator means coupled in common with the character generator means.

7. A video controller as set forth in claim 6 further comprising shift register means and wherein said cell generator means comprises a multiplexer and a video data output buffer.

8. A video controller as set forth in claim 7 including first logic gate means responsive to a first data bit signal from said video output latch means for providing a signal which is representative of either graphic generation or character generation.

9. A video controller as set forth in claim 8 including a flip-flop coupled from said first logic gate means and having alternate states including one state for enabling only the character generator means and another state for enabling only the cell generator means.

10. A video controller as set forth in claim 9 wherein said first logic gate means includes an AND gate means.

11. In a microcomputer system, a video controller comprising, video memory means, means for defining a video data bus connected to the video memory means, means defining processor address lines and a processor data bus, controller means also having address lines and an output, video data latch means coupling from the video data bus to the central processing unit data bus, multiplexer means having alternate sets of inputs, one set coupling from the controller address lines and the other set from the processor address lines, and having one and other states, means coupling the output of the multiplexer means to the video memory means address input, and control means for controlling the multiplexer means whereby in one state thereof the video memory means is addressed from the controller means and in the other state thereof the video memory means is addressed form the processor address lines.

12. A video controller as set forth in claim 11 wherein said video data read latch means comprises read/write buffer means.

13. A video controller as set forth in claim 12 including means defining a processor data bus a video data write register and meads coupling the video data write register from the processor data bus to the video data bus.

14. A video controller as set forth in claim 13 including a video output latch means and means coupling the video latch means to the video data bus.

15. A video controller as set forth in claim 14 including character generator means coupled to said video output latch means.

16. A video controller as set forth in claim 15 including cell generator means and means coupling the cell generator means and parallel with the character generator means with the cell generator means coupled in common with the character generator means.

17. A video controller as set forth in claim 16 wherein said cell generator means comprises a multiplexer and a video data output buffer.

18. A video controller as set forth in claim 17 wherein said system also includes a shift register means.

19. A video controller as set forth in claim 18 including first logic gate means responsive to a first data bit signal from said video memory means for providing a signal a state of which is representative of either graphic generation or character generation.

20. A video controller as set forth in claim 19 including a flip-flop coupled from said first logic gate means and having alternate states including one state for enabling only the character generator means and another state for enabling only the cell generator means.

21. A video controller as set forth in claim 20 wherein said first logic gate means includes an AND gate means.

22. A method of controlling a video display screen refresh and update in a system that has first and second sets of address lines, a central processing unit, and a continuous clock signal, comprising the steps of coupling a first set of said address lines to a video memory means during a portion of said clock signal for enabling a display screen refresh cycle and alternatively coupling a second set of address lines to said video memory means during another portion of said clock signal for enabling a central processing unit transfer cycle whereby said refresh cycle and said central processing unit transfer cycle proceed continuously in a time-multiplexed manner.

23. In a microcomputer system, a video controller comprising, a video memory means having an data bus and address lines, a central processing unit having address lines and a data bus, read/write buffer means coupling said video data bus to said central processing unit data bus, controller means having address lines, multiplexer means coupled from the controller address lines and central processing unit address lines, respectively, having an output, and one and other states, the output of the multiplexer means coupling to the video memory means, output video processing means, including at least a character generator means, means coupling the data bus of the video memory means to the output video processing means, and control means for controlling the multiplexer means whereby in one state thereof the video memory means is addressed from the controller means and in the other state thereof, the video memory means is addressed from the central processing unit address lines.

24. A video controller as defined in claim 23 wherein said one state is a display screen refresh cycle and said other state is a central processing unit transfer cycle, and wherein said control means includes means for time interleaving of said central processing unit transfer cycle and said screen refresh cycle.

25. A video controller as defined in claim 24 wherein said control means includes
    means for supplying a continuous clock signal to said cathode ray tube controller for sequencing said display screen refresh cycle, and means for enabling said display screen refresh cycle during a portion of said clock signal and for enabling said central processing unit transfer cycle during another portion of said clock signal such that said refresh cycle and said central processing unit transfer cycle can both proceed continuously in time-multiplexed fashion.

26. A video controller as defined in claim 23 wherein said read/write buffer means includes a video data read latch coupling between said video data bus and said central processing unit data bus for temporary storage of data being transferred from said video memory means to said central processing unit.

27. A video controller as defined in claim 26 including a video data write register coupled between said central processing unit and said video data bus for temporary storage of data being transferred from said central processing unit to said video memory means.

28. A video controller as defined in claim 27 further including video output means coupled to said video data bus for temporary storage of video data for said screen refresh cycle.

29. video controller as defined in claim 28 further including character generator means and cell generator means coupled in parallel between the output of said video output latch means and the inputs of a shift register means, and means or selectively energizing said character generator means or said cell generator means in response to the output of said video data latch means.

* * * * *